United States Patent [19]

Wetterwald et al.

[11] Patent Number: 4,629,523
[45] Date of Patent: Dec. 16, 1986

[54] PROCESS AND APPARATUS FOR PRODUCING MINERAL FIBER BOARDS

[75] Inventors: Anton Wetterwald, Solothurn, Switzerland; Jacques Abrassart; Max Moreau, both of Dour, Belgium; Stanislas Dallemagne, Mons, Belgium

[73] Assignee: Fibraconsult Management und Beratungs AG, Solothurn, Switzerland

[21] Appl. No.: 465,352

[22] Filed: Feb. 9, 1983

[30] Foreign Application Priority Data

Feb. 10, 1982 [EP] European Pat. Off. ........ 82100965.1

[51] Int. Cl.4 .............................................. B27N 3/00
[52] U.S. Cl. .................................. 156/62.8; 156/62.2; 156/62.4; 156/62.6; 156/72; 428/113; 428/212; 428/297; 428/298; 428/301; 428/302; 428/537.7
[58] Field of Search ..................... 156/62.2, 62.4, 62.6, 156/62.8, 72, ; 428/171, 172, 208, 246, 270, 297, 311.5, 315.9, 317.1, 327, 113, 537.7, 212, 298, 301, 302

[56] References Cited

U.S. PATENT DOCUMENTS

| | | | |
|---|---|---|---|
| 2,304,233 | 12/1942 | Bergin | 156/62.2 |
| 2,834,702 | 5/1958 | Gibb | 154/43 |
| 2,923,653 | 2/1960 | Matlin | 156/62.2 |
| 3,231,438 | 1/1966 | Muhm | 156/62.2 |
| 3,345,241 | 10/1967 | Shannon | 161/36 |
| 3,414,467 | 12/1968 | Ferrara | 428/537.7 |
| 3,511,731 | 5/1970 | Raynal | 156/62.2 |
| 3,690,975 | 9/1972 | Groombridge | 156/62.2 |
| 3,713,959 | 1/1973 | Rottmayer et al. | 428/113 |
| 3,991,244 | 11/1976 | Debbas | 428/113 |

FOREIGN PATENT DOCUMENTS

| | | |
|---|---|---|
| 619674 | 3/1949 | United Kingdom . |
| 918647 | 2/1963 | United Kingdom . |
| 978119 | 12/1964 | United Kingdom . |

Primary Examiner—George F. Lesmes
Assistant Examiner—P. R. Schwartz
Attorney, Agent, or Firm—Roylance, Abrams, Berdo & Goodman

[57] ABSTRACT

Mineral fiber board and process for the production thereof comprising a composite structure of several board layers. The fibers are oriented in a preferred direction in each board layer. The preferred fiber directions of successive board layers cross one another. The board layers are joined by means of a bridge formed from binders, which are added to at least one of the board layers. According to the production process, prefabricated base boards are moved in contiguous manner on a conveyor belt. The fibers of the base boards are at right angles to the conveying direction of the board. A pasty, fibrous mass is applied thereto with the belt moving and this forms the next board layer. The fibers of the pasty mass are preferably aligned parallel to the belt conveying direction. The boards are then dried. The strength, as well as the dimensional and shape stability of the boards are considerably improved.

13 Claims, 3 Drawing Figures

PROCESS AND APPARATUS FOR PRODUCING MINERAL FIBER BOARDS

The invention relates to a process and to an apparatus for producing mineral fiber boards with fibers oriented in preferred directions.

BACKGROUND OF THE INVENTION

Mineral fiber boards are mainly used as building materials. Their main constituent consists of mineral fibers such as glass, rock, slag, ceramics, etc. These mineral fibers, together with the other constituents, are shaped into boards by using known processes and, as a result of the production process, the mineral fibers assume a preferred orientation. A known process for producing such mineral fiber boards is, for example, the so-called wet felt process, which is similar to a process used in paper manufacture, as well as a process for producing boards from a spreadable mass in molds, i.e., so-called cast tiles. British Pat. No. 619,674 discloses a synthetic resin laminate, which contains fibrous materials and in which superimposed layers have fiber directions such that the fibers are at right angles to one another. This is intended to give the laminate the same load bearing capacity in both main directions parallel to the main surfaces.

It is also conventional practice to coat mineral fiber boards or to provide them with an embossed surface structure and with a coloring agent for decoration, in order on the one hand to provide a better appearance if the boards are to be used as a partition or as a ceiling board, and on the other hand to give better acoustic damping.

However, the known mineral fiber boards to not always have adequate mechanical strength characteristics for a number of applications, particularly for high-quality ceiling boards or as acoustic boards. Thus, particularly in the case of cast boards, the bending strength is inadequate, so that the boards break very easily during transportation or installation. A further disadvantage of known boards is that they sag relatively easily in the case of high atmospheric humidity and, in extreme cases, ceiling boards can become detached from the suspension means and can fall to the ground. In order that these disadvantages do not reach serious proportions, known mineral fiber boards, particularly to be used as ceiling boards are only supplied in relatively small sizes, which makes installation more expensive due to the complicated support means and the considerable labor costs.

BRIEF SUMMARY OF THE INVENTION

Thus, an object of the invention is to improve the mechanical strength of fiber boards in such a way that the accuracy to size is ensured, even in the case of high atmospheric humidity, while giving the boards better bending strength, so that they can be manufactured, processed and handled in larger sizes than hitherto.

Briefly described, the invention includes a process for producing a composite mineral fiber board having fibers oriented in selected directions for preferred strength characteristics comprising forming a first mineral fiber board layer in which the fibers have a predominant directional orientation, conveying the first layer to and through an application station, applying to the upper surface of the first layer a second layer of a pasty, fibrous mass as the first layer passes through the application station such that the fibers in the second layer have a predominant directional orientation which is substantially perpendicular to the fiber orientation in the first layer, and drying the resulting product to form a composite board having improved characteristics.

One advantage of the invention is that the bending strength of the mineral fiber board is approximately doubled, which permits a better and easier handling of such boards. In addition, the accuracy of size, particularly under the influence of moisture, is decisively improved. A further advantage is that, e.g., through a suitable combination of different board layers, the fireproofing characteristics of the complete board as a building material are improved.

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE PREFERRED EMBODIMENTS

Figure 1:
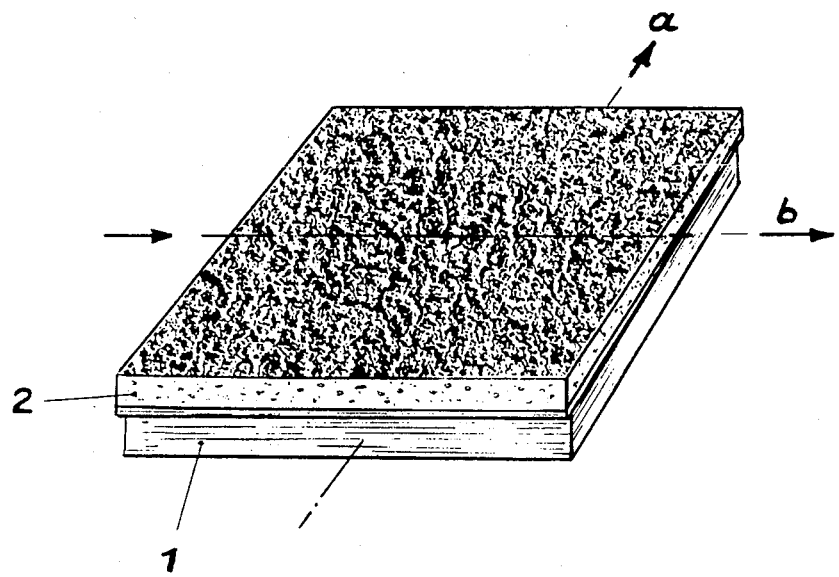
FIG. 1 is a perspective view of a ceiling board in accordance with the present invention.
Figure 2:
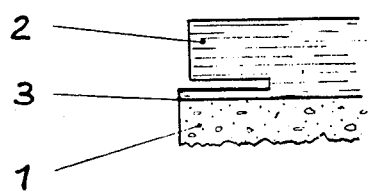
FIG. 2 is a fragmentary sectional view of a portion of the board of FIG. 1.

The ceiling board shown in exemplified manner in FIGS. 1 and 2 is a composite structure of a base board 1 and a second board layer 2. The base board 1 comprises, e.g., more than 50% by weight mineral wool, whose fibers are preferably oriented in direction "a" as shown by the arrows in FIG. 1. Orientation takes place during the production process which is known, and in which the material is introduced onto a moving conveyor belt, so that the aforementioned orientation of the fibers is obtained. Further constituents of the base board are 10 to 15% by weight of clay or other fillers, 5 to 10% by weight of waste paper or other organic fibers and 5 to 10% by weight of starch, all of the percentages being related to the dry weight. The second board layer 2, connected by means of a boundary layer 3 with base board 1, contains as the main constituent fibrous products (in the present case at least 50% by weight) and, together with the other constituents, starch as the binder and preferably in a proportion between 5 and 10% by weight, accompanied by 5 to 15% by weight of clay. The second board layer 2 also has a preferred orientation direction of its fibers, as indicate by arrow "b" in FIG. 1. The direction of the orientation "b" for the second board layer is at right angles to orientation direction "a" of base board 1. In the example shown, the two directions form an angle of 90°.

Figure 3:
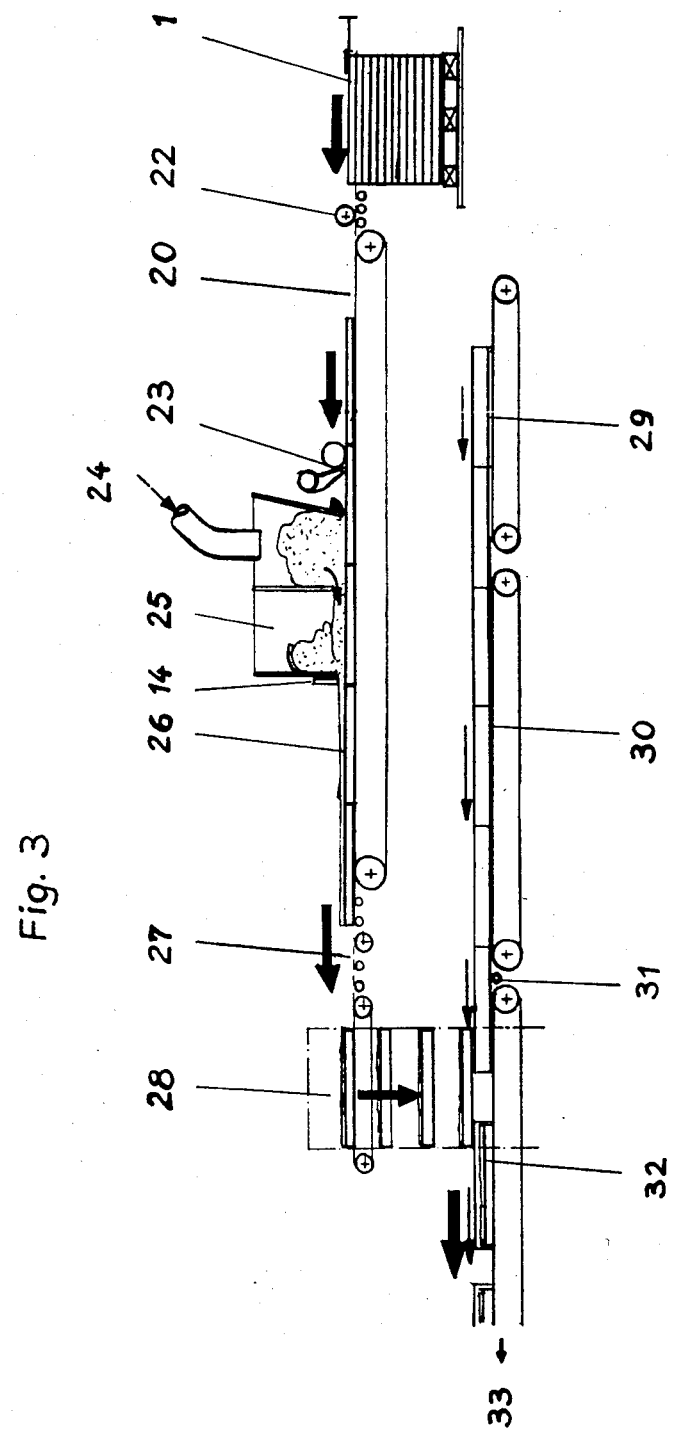
FIG. 3 is a schematic side elevation of an apparatus for performing the production process in accordance with the invention.

The production of such boards is described hereinafter with reference to FIG. 3. Prefabricated dry base boards 1 are conveyed directly from a stack onto a conveyor belt 20. Feed means 22 moves the boards onto conveyor belt 20 in such a way that the base boards are in succession without any gaps between them. When placing the base boards 1 on conveyor belt 2 it must be ensured that the preferred fiber direction "a" according to FIG. 1 is at right angles to the feed direction on belt 20. The boards pass through a cleaning device 23, which in the present example comprises a cleaning roller and a suction device.

The now cleaned boards reach an application or coating station 25, in which a slurry or paste-like moist mass is placed on the dry base boards 1. This mass, which is fed to the application station 25 by a supply means 24 contains, as stated hereinbefore for the second board layer 2, fibrous products as the main constituent. On leaving application station 25, there is a doctor blade 14, which determines the thickness of the coating applied to the base boards. The construction or movement of the doctor blade edge determines the surface structure of the applied pasty mass.

When the base boards 1 leave application station 25, in the end area 26 of conveyor belt 20, they are coated with a fibrous mass, the fibers of which have a dominant orientation in which they are aligned with the direction of conveyance and, therefore, at right angles to that of boards 1.

The wet, spreadable mass continuously applied to the dry base boards 1 in application station 25 is nondetachably joined with said board by the penetration of the starch solution at the boundary layer 3, of FIG. 2.

With the aid of a second feed device 27, the coated boards are separately fed to an elevator apparatus 28 and are lowered into support molds 29 below it. These support molds are supplied by a conveyor belt 30. A positioning device 31 ensures that in each case a free support mold is placed beneath a board being delivered by elevator 28. As soon as the mold is beneath the board, the latter is lowered into the mold. Board 32 in the mold then leaves the device and is subsequently supplied to a drying oven 33. The boards coated with the pasty mass can also be continuously supplied to the drying process at right angles on a combined conveyor with convex rollers.

The following drying process lasts several hours with maximum temperatures of approximately 150° C. In the preferred embodiment, the temperature in the oven is elevated at about one hour intervals from 90° C. to 120° C., 140° C. and then to 155° C. and remains at this temperature for 1½ hours. The temperature is then lowered to 60° C. for 4½ hours. The tensile stresses and the resulting deformations (dishing) during the drying process are compensated by constructing the support mold 29 with a convex bottom with a negative curvature having a ratio of chord height to chord length between about 0.5% and about 1.0%. Preferably, with a mold width of 635 mm, the chord height is between 3 and 4 mm and the ratio is approximately 0.6%. At the end of the drying process, the thus formed composite boards left the drying oven 33 in a completely flat form.

Mineral fiber composite boards of 30×30 cm size produced in this way gave the following results compared with single mineral boards, the thickness of base board 1 being 13 mm and that of the second board layer 8 mm. A total thickness of 19 mm was obtained after the drying of the composite board by the partial milling of the back of the base board, because the comparison board also had a thickness of 19 mm. The comparison figures for the single layer board are given in brackets:

1. Bending strength: 9 kg/cm² [4 kg/cm²]
2. Production losses by edge breaking: 0.95% (5%)
3. Climatic test: at 90% relative atmospheric humidity the longitudinal sag after 4 weeks was 0.09 mm (comparison board after 2 weeks 1.2 mm). With 95% relative atmospheric humidity, there was a sag of 0.14 mm after 72 hours (comparison board: sag 2.27 mm).

Although in the preferred embodiment, the combining of a solid base board and a second board layer applied in paste-like manner was described, similar good results can be obtained with composite boards formed from two or more board layers laminated on one another, wherein in all cases the preferred fiber directions of successive plates intersect one another. Thus, composite boards were produced from crossed, dried base boards 1 and gave similar good results to those obtained with the board described in the embodiment.

Particularly good results were obtained if the pasty mass for the second board layer 2 had the following composition: fibrous product approximately 75%; kaolin, approximately 13%; starch, approximately 10%; and the remainder being guar gum, phenolic resin and silicone. It is also possible to add relatively small quantities of other substances, which act as thickeners, dispersing agents or water resistance improving agents.

A pasty mass like that given as the constituent for the second board layer, can also be processed to a composite board with cross-oriented fiber layers by using the aforementioned process a number of times and without using the base board produced by the wet felt process. Such a composite board also has better properties than known boards of this type.

Boards produced in this way are eminently suitable as wall or ceiling boards, because they have a good dimensional and shape stability. Such boards can be produced and processed in desired sizes without any significant limitations with regards to possible size changes. The risk of breakage is considerably reduced during the storage, transportation and installation of the boards.

Through the choice of suitable profiles and movements for the doctor blade edge when applying the pasty mass and by per se known embossing and suction methods, it is possible to produce many different surface patterns and structures. A similar wide variety can be obtained by a subsequent processing of the board surface, e.g. by grinding or milling.

While certain advantageous embodiments have been chosen to illustrate the invention it will be understood by those skilled in the art that various changes and modifications can be made therein without departing from the scope of the invention as defined in the appended claims.

What is claimed is:

1. A process for producing a composite mineral fiber board having fibers oriented in generally perpendicular directions for preferred strength characteristics, comprising:
    forming a first mineral fiber board layer having fibers in a first predominant directional orientation and an upper surface;
    conveying the first layer to and through an application station in a direction perpendicular to the directional orientation of the fibers in the first layer;
    applying to the upper surface of the first layer, a second layer of a slurry or paste-like moist mass containing fibers as the first layer passes through the application station such that fibers in the second layer have a second predominant directional orientation which is substantially perpendicular to the first directional orientation of the fibers in the first layer;
    placing each composite board in a convex mold before drying; and drying the resulting product in the convex mold to evaporate moisture and to form a flat composite board having improved characteristics.

2. A process according to claim 1 wherein each of the board layers is formed in major part from mineral fiber products and includes between about 5% and about 10% by weight of the dried mass of binder material.

3. A process according to claim 2 wherein the binder material includes an organic binder.

4. A process according to claim 2 wherein the binder material includes an inorganic binder.

5. A process according to claim 4 wherein the binder is starch.

6. A process according to claim 1 wherein the second board layer contains in major part mineral fiber products and further includes between about 5% and about 45% by dry weight of fillers and smaller amounts of thickeners, dispersing agents and additives for improving the resistance to water of the final product.

7. A process according to claim 1 wherein the first layer is prefabricated and is delivered by a conveyor belt to the application station.

8. A process according to claim 7 wherein a plurality of first layers are conveyed in serial, contiguous manner, with no intervening gaps, to the application station, each of the first layers being disposed with its dominant fiber direction perpendicular to the direction of conveyance, the fibers in the moist mass being preponderantly aligned with the direction of conveyance.

9. A process according to claim 7 wherein the composite board is placed in an oven for drying and wherein the temperature is increased at hourly intervals from an initial temperature of about 90° C. to about 120° C., then to about 140° C. and then to about 155° C., maintained at 155° C. for about 1.5 hours and then reduced to about 60° C. over a period of 4.5 hours.

10. A process according to claim 1 wherein the composite board is placed in an oven for drying and wherein the temperature is increased at hourly intervals from an initial temperature of about 90° C. to about 120° C., then to about 140° C. and then to about 155° C., maintained at 155° C. for about 1.5 hours and then reduced to about 60° C. over a period of 4.5 hours.

11. A process according to claim 1 wherein a plurality of composite boards are continuously supplied to a drying station on a belt or roller conveyor having a convex support shape.

12. A process according to claim 7 wherein each mold comprises a convex bottom with a curvature having a chord height to chord length ratio between about 0.5% and about 1%.

13. A mineral fiber board produced by the process according to claim 1 wherein the first layer is a prefabricated base board containing between about 10% and about 15% by weight of fillers and between about 5% and about 10% by weight of organic fibers.

* * * * *